3,499,129
LINE TENSION HIGH VOLTAGE CIRCUIT
INTERRUPTER
Leonard A. Hulteen and William H. Gilliland, Birmingham, Ala., assignors to USCO Power Equipment Corporation, Birmingham, Ala., a corporation of Alabama
Original application Oct. 17, 1966, Ser. No. 587,071. Divided and this application Nov. 13, 1967, Ser. No. 705,249
Int. Cl. H01h 31/00, 85/02; H01b 17/16
U.S. Cl. 200—48                                      6 Claims

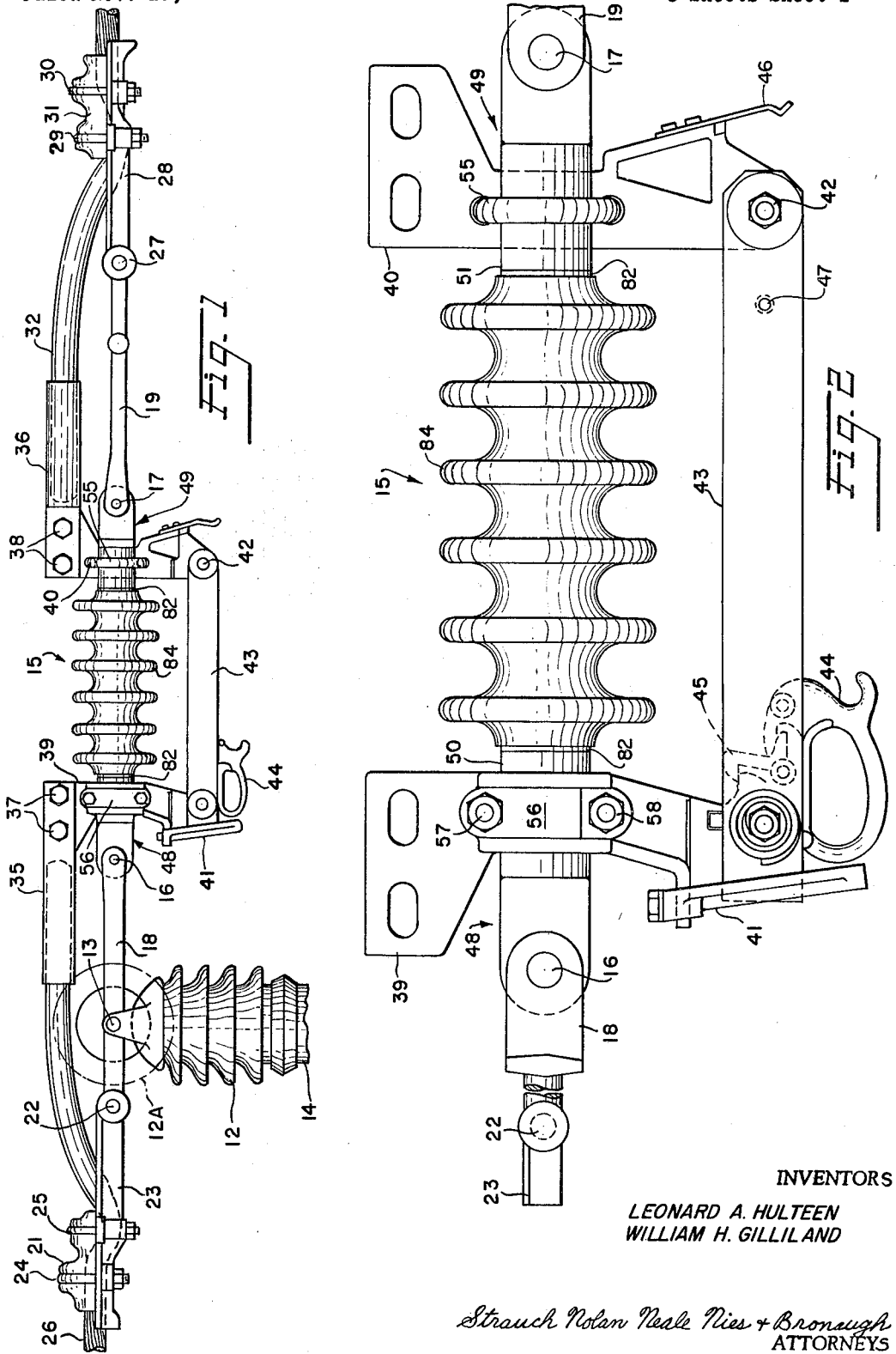

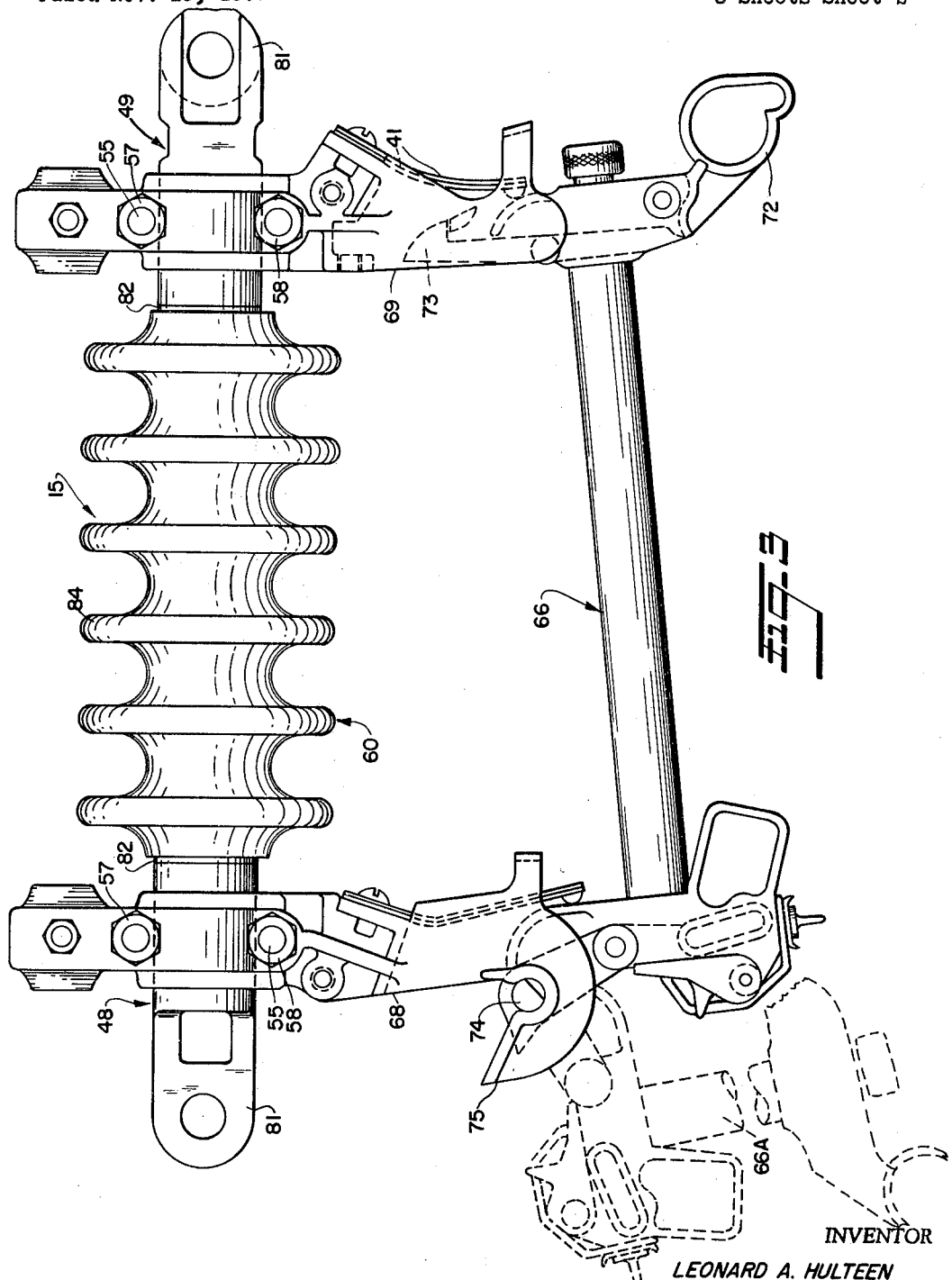

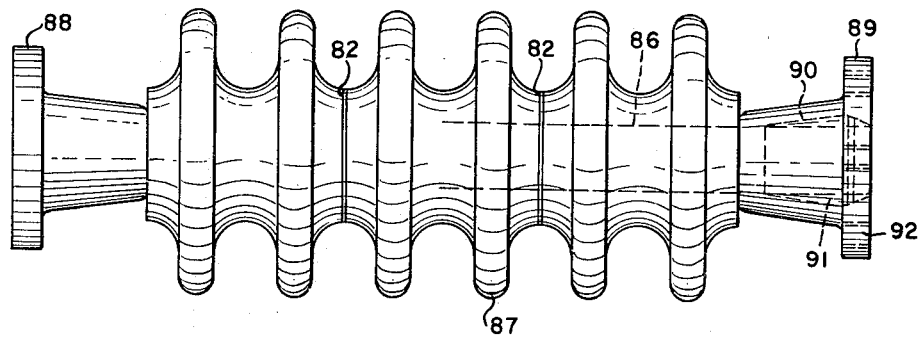
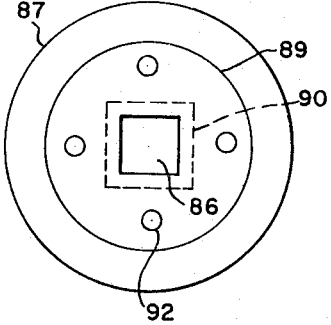
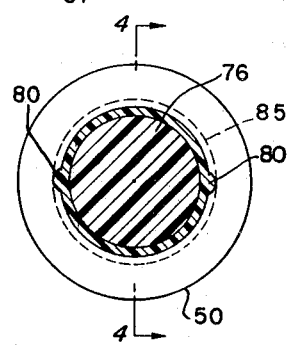
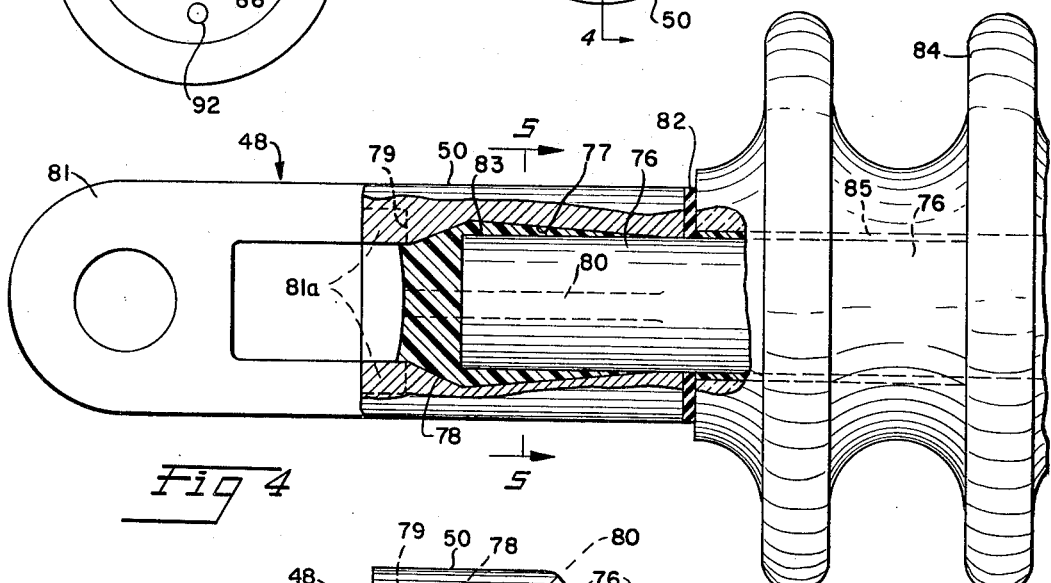
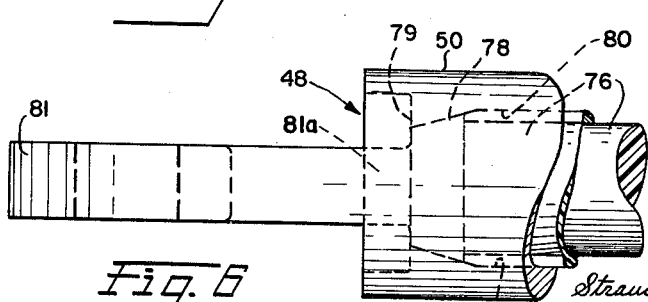
INVENTORS
LEONARD A. HULTEEN
WILLIAM H. GILLILAND United States Patent Office 3,499,129
Patented Mar. 3, 1970

ABSTRACT OF THE DISCLOSURE

An in the line circuit interrupter and insulator assembly for high voltage electric lines including a tension insulator having metal end terminal line connectors axially and nonrotatably fixed to the opposite rod-like ends of a skirted insulator and being shaped to provide mounting surfaces inwardly from their line connections and a switch or fuse interrupter assembly having respective mounting fittings designed to grippingly encompass the insulator mounting surfaces so the interrupter can be selectively angularly fixedly related to the insulator axis and its aligned connected transmission line or lines for ready service usage from a predetermined angle of approach or to avoid inadvertent contact adjacently related power lines, switching structure, and/or poles.

This application is a division of application No. 587,071 originally filed on Oct. 17, 1966 and now abandoned.

BACKGROUND OF THE INVENTION

This invention relates to disconnect devices such as switches or fuses in high voltage electric lines, wherein a strain insulator is mounted directly in the high tension line and the disconnect device is carried directly by the insulator.

Such disconnect devices are shown in the copending application of William Austin Lankford, Ser. No. 419,339, filed Dec. 18, 1964 for Line Tension Circuit Interrupter and this invention is an improvement over the disconnect device shown therein.

The present invention relates to a novel construction whereby a disconnect switch may be mounted at any desired angle about the axis of the insulator, which is affixed to a pole insulator so as to be non-rotable about its own axis, but is rotatable about a horizontal axis so as to be coaxial with the high tension line, which usually approaches the pole insulator at an angle.

The novel construction also permits a larger variation in tolerances in the length of the switch or fuse, since they are clamped to cylindrical metal fittings on the ends of the fiber glass rod.

It is accordingly a primary object of the invention to provide a novel combination of high voltage disconnect device and a strain insulator wherein the disconnect device may be mounted at any selected angle about the axis of the strain insulator.

Another important object of the invention is to provide a strain insulator for a high voltage disconnect device wherein considerable tolerance is permitted in the length of the disconnect device with respect to the insulator, and wherein the disconnect device may be added to the insulator after the high tension line is mounted upon the poles.

BRIEF DESCRIPTION OF DRAWINGS

Other objects will appear as the description proceeds in connection with the appended claims and the attached drawings, wherein:

FIGURE 1 is a view in side elevation of a combined disconnect device and insulator mounted in a high voltage line in accordance with the invention.

FIGURE 2 is an enlarged view in side elevation of the combined disconnect device and insulator of FIGURE 1, but not connected to a high voltage line.

FIGURE 3 is a view similar to FIGURE 2 but showing a fused disconnect switch instead of a hook-stick switch, and with different end fittings.

FIGURE 4 is an enlarged side view, partly in section along the line 4—4 of FIGURE 5, of the left end of the insulator assemblies of FIGURES 1 and 2.

FIGURE 5 is a sectional view along the line 5—5 of FIGURE 4.

FIGURE 6 is a top plan view of the left end of FIGURE 4.

FIGURE 7 is a view in side elevation of another form of assembly of porcelain insulators fiber glass rod, and metallic end members.

FIGURE 8 is an end view, of the assembly of FIGURE 7, as viewed from the right hand end thereof.

DESCRIPTION OF THE PREFERRED EMBODIMENT

Referring to FIGURE 1, a line post insulator is indicated at 12. This may be fastened to the post or a crossbar in a vertical position as shown, or may be attached horizontally. In either event the pivotal support 13 at its outer end has a horizontal axis, as shown in the aforesaid Lankford application, Ser. No. 419,339, now Letters Patent 3,300,599. In FIGURE 1 the line post insulator 12 is shown affixed to a cross-bar 14 on a line post, not shown. The dot-dash lines indicate a line post insulator 12A in horizontal position. A line tension insulator, generally indicated at 15, which will be described in detail, is pivotally connected as by pins 16 and 17 to a pair of strain extension links 18 and 19, the left-most link 18 being pivotally attached about a horizontal axis at the pivotal support 13 to the outer end of the line post insulator 12.

The strain extension link 18 extends to beyond the pivotal support 13 of FIGURE 1 to where it is pivotally attached, as by a pin 22 to a strain clamp 23 which carries two U bolts 24 and 25 and a fitting 21 that secure a high tension line 26 to the strain clamp 23. The other strain extension link 19 is similar to the link 18 and similarly connected by a pin 27 to a strain clamp 28. U bolts 29 and 30 and a fitting 31 secured the high tension line 32 to the strain clamp 28.

Both high tension lines 26 and 32 have their ends protruding beyond the strain clamps and have their free ends secured in "anti-bird caging" compression type terminal lugs 35 and 36 that are secured as by bolts 37 and 38 to a pair of terminals 39 and 40 which carry a fixed contact 41 and a pivot 42 respectively for a movable blade 43 of a conventional hook-stick switch. A ring 44 is engageable by a hook stick to disengage a latch 45 that normally holds the movable blade 43 closed and in engagement with the fixed contact 41. In open position a spring 46 engages a pin 47 on the blade to hold it in open position.

The line tension insulator 15 terminates at either end in similar nodular iron castings which have cylindrical portions 50 and 51 protruding coaxially from the ends of the insulator 15. The castings 48 and 49 at their outer ends have central planar projections which fit within clevises in the strain extension links 18 and 19, being secured thereto by the pins 16 and 17. The novel manner in which castings 48 and 49 are attached to the line tension insulator 15 will be described later.

One of the features of the invention is the structure by which the switch is attached to the insulator 15. This is accomplished by a pair of U bolts that clamp it to the cylindrical portions 50 and 51 of the castings 48 and 49.

Referring to FIGURE 2 the closed side of a U bolt is indicated at 55. Its legs protrude through holes through the fixed terminal 40 where a clamp and nuts similar to the clamp 56 and nuts 57 and 58 at the left portion of FIGURE 2 secure the other U bolt to the cylindrical portion 50 of casting 48. The two U bolts could obviously face in the same direction. Since the U bolts can be placed anywhere along the lengths of cylindrical portions 50 and 51 this allows a much greater tolerance in the dimensions of the length of the switch assembly that is secured to the insulator. The switch can be secured in any desired angle about the axis of the high tension line which is desirable in many installations. Another feature is that the insulator 15 can be connected into the high tension line and a switch or fuse 65, as shown in FIGURE 3, may be installed at a later date. An installed switch may be replaced with a fuse or vice versa, without removing the line tension.

Referring to the fused disconnect switch shown in FIGURE 3, the outer ends of the castings 48 and 49 have pivotal connection to extension links such as 18 or 19 of FIGURE 1 through the central planar projections. The fuse tube of fused disconnect switch 65 is indicated generally at 66. Brackets 68 and 69 which support the fuse disconnect switch 65 are secured to the cylindrical portions 50, 51 of the castings by U bolts 55 in the same maner as the fixed terminals 39 and 40 of FIGURE 1. This permits a substantial tolerance of the distance between brackets 68 and 69 and the fused disconnect switch parts carried thereby.

As is well known to those skilled in the art the switch 65 can be opened either by engaging a hook stick in the pivoted ring 72 to disengage a latch 73, or will automatically open when an overload occurs that will melt a fuse in fuse tube 66 and unlatch the switch so that the fuse tube drops to the open position indicated at 66A. The fuse tube 66 is of a dielectric material for the expulsion of the arc that occurs therein when the fuse passing through its melts under overload, and is suitably vented. The fuse tube is hinged to a fixed support 75 by a pin 74. While the U bolts 55 would allow the placement of the fuse tube at any angle around the axis of the high tension line, they are not used for this purpose because the brackets 68 and 69 and the fuse tube 66 must hang vertically so that the fuse tube 66 can drop when the fuse within it melts under overload. However, they do permit a wide tolerance between the brackets 68 and 69 in placement of the fuse tube supports, with consequent reduction in manufacturing costs.

The invention requires an insulator composed of a fiber glass rod with its ends axially fixedly and non-rotatably secured in metallic end fittings and carrying a series of porcelain skirts to insulate and reduce high voltage tracking along the fiber glass rod between the metallic end fittings for an equivalent structure wherein the metallic end fittings are permanently positively restrained against rotation. The aspect of the invention is illustrated in FIGURES 4–7 of the drawings.

FIGURE 6 is an enlarged view of the left end of the insulator of FIGURE 2, with a portion cut away to show the internal construction. At 76 is shown a plastic impregnated fiber glass rod with its left end seated in a cored tapered cavity 77 in the cylindrical section of the casting 48 the taper angle being of the order of 6°. The cavity converges inwardly to the right as viewed in FIGURE 6 to a diameter to closely but freely receive the fiber glass rod end. At the left end of the cavity 77 there is an inward convergence 78 to the left that terminates in a cylindrical cavity 79 opening through the left end of the cylindrical portion 50 to permit introduction of the cement 83. Cavity 79 is interrupted at diametrically opposite points by radial inward rib formations 81a formed by the inner ends of the longitudinally extending end mounting tongue 81. Within the tapered cavity 77 there are at least two longitudinal cavities 80 of equal depth to the largest diameter of tapered cavity 77 which, when the casting 48 is assembled with the fiber glass rod 76 upon introduction of the molten cement through cavity 79, will fill with cement and form a locking key means for a purpose to be hereinafter described. The cement flows into the cavity spaces around the rod end and along cavities 80, in part at least under capillary action to completely fill these spaces and firmly bond with the rod end.

In order to assemble the end of the fiber glass rod 76 to the casting 48, the interior of the entire cavity 77 is preferably wiped or coated with a release agent, such as paste wax, to avoid adherence of the cement to the cavity walls and concentrate the shear forces to the resulting tapered keys formed by the cement in cavities 80. The end of the fiber glass rod, carefully cleaned of mold release agents, is inserted into cavity 77 in centered relation and fluid cement 83, such as epoxy or equivalent with high compressive strength fillers such as silica and mineral powders of aluminum, bronze or iron, is introduced through cavity 79 into cavity 77 to encompass the end of rod 76 substantially as shown in FIGURE 4. When the cement hardens, the bond between it and the rod 76 is virtually inseparable. The release agent between the cement and the inner wall of the cavity prevents a bond therebetween while assuring the cement therein to be in compression when the insulator is assembled and placed under longitudinal tension. The cement fills the cavities 80 within the casting and prevents relative rotational movement between the casting 48 and the fiber glass rod 76 and the tapered wedge of cement formed by the tapered cavity 77 prevents the rod 76 from pulling axially out of the casting 48.

A ribbed porcelain insulator 84 having a central bore that fits over the fiber glass rod 76 extends between the terminal castings 48 and 49. There is sufficient clearance between the bore of the insulator 84 and the fiber glass rod 76 so that a charge of cement 85 similar to the cement 83 introduced into the clearance will firmly secure the insulator 84 to rod 76. The insulator 84 may be in one piece, in which case silicone rubber seal washers 82 are interposed between its ends and castings 48 and 49, or may comprise a series of skirts having central bores and arranged in end abutting relationship along the rod 76. In the latter case silicone rubber seal washers 82 (FIGURE 7) are preferably placed between adjoining skirts of the series. The other terminal casting 49 has a cavity similar in all respects to that shown in FIGURE 4 and is secured to the other end of the fiber glass rod 76 in the same manner. The resilient compressive washers 82 provide a cushion between the brittle porcelain components and/or the metal end fittings and accommodate any undue mechanical stresses on the porcelain components due to thermal expansion and contraction of the parts.

Because of the prevention of rotation between the terminal castings 48 and 49 through the cemented connection therewith, the switch of FIGURES 1 and 2 may be clamped in any angular position about the axis of the high tension line by the U bolts 55 fixed to cyclindrical portions 50, 51 of castings 48 and 49. This is desirable because it is not always practical to mount the switch hanging vertically downwardly. If the fuse type switch of FIGURE 3 is used, key or rib formations within the cavities 80 in castings 48 and 49 will prevent the fused switch from swinging about the axis as under the influence of the wind.

DESCRIPTION OF ALTERNATE EMBODIMENT

FIGURES 7 and 8 illustrate another method of securing a fiber glass rod from rotating within the end castings. In this embodiment the end castings are of the conventional flanged type. In this case a fiber glass rod 86 is cemented to a bore in an insulator as in the previous embodiment, and extends into a cored cavity in each end casting 88 and 89. The cavities within castings 88 and 89 are frusto-pyramidal in shape, with their narrow ends facing the insulator, as indicated by the cavity 90 in FIGURE 7, leaving the larger end open for introduction of cement. This furnishes a non-rotatable connection between the cement 91 in the cavity and the castings just as rib formations 80 do in the embodiment of FIGURES 4 to 6. Openings 92 in the castings provide means for securing the insulator to the switch with which it will be used.

It will be understood that the irregularly shaped tapered cavities of FIGURES 4 and 7 are merely two examples of irregularly shaped cavities that will prevent rotation of the fiber glass rods therein, and that other irregularly shaped cavities may be used. Also, the pyramidal cavity 90 of FIGURE 7 could as will be used in the embodiment of FIGURE 4 instead of the ribbed cavity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A circuit interrupter comprising:
   (a) a rigid strain insulator terminating at its ends in metallic cylindrical elements coaxial with and rigidly affixed to said strain insulator;
   (b) a circuit interrupting switch having means to affix each end to said cylindrical elements in any angular position with respect to the axis of a high tension line;
   (c) said means comprising clamps embracing said metallic cylindrical elements;
   (d) and means affixed to at least one of said metallic cylindrical elements to prevent rotation of said strain insulator about its longitudinal axis.

2. In the circuit interrupter described in claim 1, fixed terminals at each end of said circuit interrupting switch and connected to said switch to support it, said cylindrical elements on said strain insulator being substantially longer than the width of said clamps, whereby the distance between said fixed terminals is not critical, said clamping means being secured to said fixed terminals.

3. In the circuit interrupter described in claim 1, said switch being a hook stick switch that is operable in any plane about the longitudinal axis of said strain insulator.

4. In the circuit interrupter described in claim 1, a fiber glass rod fixedly connecting said cylindrical elements, and a ribbed porcelain insulator surrounding said rob between said cylindrical elements.

5. In the device described in claim 4 each of said metallic cylindrical elements having a tapering cavity with its smaller dimension facing said fiber glass rod, the ends of said rods extending into said cavities, and the space between said rod and the inner walls of said cavities being filled with a cement that bonds securely to said rod, forming tapering ends on said rod and preventing said rod from being withdrawn from said cavities in said metallic elements.

6. In the device described in claim 1, a line post insulator having a pivotal support, and means pivotally connecting one of said metallic cylindrical elements to said line post insulator for rotation solely in a vertical plane.

References Cited

UNITED STATES PATENTS

| | | | |
|---|---|---|---|
| 1,712,432 | 5/1929 | Hagerman | 200—48 |
| 2,439,164 | 4/1948 | Fox | 200—48 |
| 2,692,315 | 10/1954 | Hubbard et al. | 337—202 X |
| 3,164,694 | 1/1965 | Gorman et al. | 200—48 |
| 3,300,599 | 1/1967 | Lankford | 200—48 |

FOREIGN PATENTS

| | | |
|---|---|---|
| 911,001 | 11/1962 | Great Britain. |
| 1,121,187 | 1956 | France. |

ROBERT K. SCHAEFER, Primary Examiner
H. J. HOHAUSER, Assistant Examiner

U.S. Cl. X.R.

174—179; 337—202